United States Patent
An et al.

(10) Patent No.: US 11,577,973 B2
(45) Date of Patent: Feb. 14, 2023

(54) FLUID TREATMENT APPARATUS

(71) Applicant: City University of Hong Kong, Kowloon (HK)

(72) Inventors: Alicia Kyoungjin An, New Territories (HK); Paula Jungwon Choi, Kowloon (HK)

(73) Assignee: City University of Hong Kong, Kowloon (HK)

( * ) Notice: Subject to any disclaimer, the term of this patent is extended or adjusted under 35 U.S.C. 154(b) by 183 days.

(21) Appl. No.: 16/902,761

(22) Filed: Jun. 16, 2020

(65) Prior Publication Data

US 2021/0387872 A1 Dec. 16, 2021

(51) Int. Cl.
| | | |
|---|---|---|
| C02F 1/44 | (2006.01) | |
| C02F 1/00 | (2006.01) | |
| C02F 1/68 | (2006.01) | |

(52) U.S. Cl.
CPC .............. *C02F 1/447* (2013.01); *C02F 1/001* (2013.01); *C02F 1/006* (2013.01); *C02F 1/445* (2013.01); *C02F 1/68* (2013.01); *C02F 2209/03* (2013.01)

(58) Field of Classification Search
CPC .......... C02F 1/001; C02F 1/006; C02F 1/444; C02F 1/445; C02F 1/447; C02F 1/68; C02F 2101/301; C02F 2101/36; C02F 2209/03; C02F 2303/16; B01D 61/002; B01D 61/005; B01D 61/14; B01D 61/145; B01D 61/147
See application file for complete search history.

(56) References Cited

U.S. PATENT DOCUMENTS

| | | | | |
|---|---|---|---|---|
| 3,562,152 A | * | 2/1971 | Davison | C02F 1/44 210/641 |
| 10,850,991 B2 | * | 12/2020 | Zhou | C02F 1/442 |
| 11,090,609 B2 | * | 8/2021 | Kang | B01D 63/06 |
| 2012/0180656 A1 | * | 7/2012 | Jeong | C02F 1/445 210/652 |

FOREIGN PATENT DOCUMENTS

KR 20170047090 5/2017

* cited by examiner

*Primary Examiner* — Terry K Cecil
(74) *Attorney, Agent, or Firm* — Renner Kenner Greive Bobak Taylor & Weber

(57) ABSTRACT

A fluid treatment apparatus includes: a first tank portion arranged to receive a first fluid from a first fluid source; a second tank portion adapted to contain a second fluid and receive water molecules of the first fluid from the first tank portion, wherein the concentration of the second fluid is higher than that of the first fluid; a third tank portion arranged to collect the water molecules of the first fluid from the second tank portion; a first membrane positioned between the first and second tank portions and arranged to filter the water molecules of the first fluid from the first tank portion; and a second membrane positioned between the second and third tank portions and arranged to obtain the water molecules of the first fluid from the second tank portion, wherein the second membrane has a greater permeability than that of the first membrane.

22 Claims, 3 Drawing Sheets

FLUID TREATMENT APPARATUS

TECHNICAL FIELD

The present disclosure relates to a fluid treatment apparatus, in particular but not limited to, a fluid treatment apparatus for treatment of wastewater.

BACKGROUND

According to the United Nations' World Water Development Report 2018, global water demand has been increasing by 1% per year for the past decades as a function of economic and societal facts, and this trend is expected to continue in the near future. Further pressures on water resources form emerging pollutants (EPs), such as Perfluoroalkyl substance (PFAS), PFAS have been in use since the 1940s in a wide range of industrial and commercial applications, have become an emerging concern. Due to their stability, resulting from the bound flourine, lipophobicity and hydrophobicity and they are extremely stable, non-biodegradable and persistent in the environment.

Perfluorooctane sulfonate (PFOS) and perfluorooctanoate (PFOA) are the two compounds most commonly and widely detected PFAS, are recognized as growing environmental risks. PFOA and PFOS are readily found in almost all human blood samples collected worldwide, in measurable (ng/mL) levels and this can increase the health risk of human population. Also, the effluents from wastewater treatment plants (WWTPs) are the main source of contamination for both PFOA and PFOS. Therefore, it is crucial that PFOA and PFOS are removed from the wastewater, especially for the potable water production.

The present invention seeks to track or at least mitigate one or more of the aforementioned problem.

SUMMARY OF THE INVENTION

In accordance with one aspect of the present invention, there is provided a fluid treatment apparatus (10) comprising: a first tank portion (100) arranged to receive a first fluid (FS) from a first fluid source; a second tank portion (300) adapted to contain a second fluid (DS) and arranged to receive water molecules of the first fluid (FS) from the first tank portion (100), wherein the concentration of the second fluid (DS) is higher than that of the first fluid (FS); a third tank portion (600) arranged to collect the water molecules of the first fluid (FS) from the second tank portion (300); a first membrane (200) positioned between the first and second tank portions (100, 300) and arranged to filter the water molecules of the first fluid (FS) from the first tank portion (100); and a second membrane (400) positioned between the second and third tank portions (300, 600) and arranged to obtain the water molecules of the first fluid (FS) from the second tank portion (300), wherein the second membrane (400) has a greater permeability than that of the first membrane (200).

In one aspect of the present invention, the flow of the first fluid (FS) from the first tank portion (100) to the second tank portion (300) is manipulated by the osmotic pressure difference between the first fluid (FS) in the first tank portion (100) and the second fluid (DS) in the second tank portion (300).

In one aspect of the present invention, the first tank portion (100) is applied a pressure to maintain the osmotic pressure between the first fluid (FS) in the first tank portion (100) and the second fluid in the second tank portion (300).

In one aspect of the present invention, the net physical pressure of the first tank portion (100) and the second tank portion (300) is zero.

In one aspect of the present invention, the fluid treatment apparatus (10) further includes a pump unit (P1) for pressurizing the first tank portion (100), thereby counteracting against the osmotic pressure generated in the second tank portion (300).

In one aspect of the present invention, the second membrane (400) has a greater effective membrane area than the first membrane (200).

In one aspect of the present invention, the second membrane (400) is a low pressure membrane.

In one aspect of the present invention, the second membrane (400) is reinforced by a porous spacer (500).

In one aspect of the present invention, the flow of the first fluid (FS) from the second tank portion (300) to the third tank portion (600) is manipulated by the internal pressure resulted from an increase of volume of the first fluid (FS) in the second tank portion (300).

In one aspect of the present invention, the fluid treatment apparatus (10) further includes a stirring means (700) arranged to facilitate the uniform concentration of the first fluid (FS) and the second fluid (DS) in the second tank portion (300).

In one aspect of the present invention, the fluid treatment apparatus (10) further includes a low concentration source (T6) in fluid communication with the third tank portion (600), whereby a low concentration fluid is flowed from the third tank portion (600) to the second tank portion (300) by the osmotic pressure difference between the second tank portion (300) and the third tank portion (600).

In one aspect of the present invention, the fluid treatment apparatus (10) further includes a high concentration source (T3) in fluid communication with the first tank portion (100), whereby a high concentration fluid is circulated through the first tank portion (100) to generate the osmotic pressure difference between the first tank portion (100) and the second tank portion (300).

In one aspect of the present invention, the fluid treatment apparatus (10) further includes a retaining tank (T4) operable to temporarily retain the second fluid (DS) in the second tank portion (300).

In one aspect of the present invention, the fluid treatment apparatus (10) further includes at least one cleaning agent source (T2, T5, T7) in fluid communication with one of the tank portions (100, 300, 600).

In one aspect of the present invention, the fluid treatment apparatus (10) further includes a sensing module (S1) arranged to determine the quality of the collected fluid.

In one aspect of the present invention, the collected fluid is transferred into a first tank (800) if the quality of the fluid satisfies a first threshold.

In one aspect of the present invention, the collected fluid is transferred into a second tank (900) and subjected to further treatment if the quality of the fluid is below the first threshold.

In one aspect of the present invention, the first threshold is associated with the polyelectrolyte concentration.

In one aspect of the present invention, the second fluid (DS) has a concentration ranged from 10 to 50 g/L.

In one aspect of the present invention, the second fluid (DS) includes polymer.

In one aspect of the present invention, the polymer includes Poly(sodium 4-styrenesulfonate).

In one aspect of the present invention, the Poly(sodium 4-styrenesulfonate) is filtered by the second membrane (400).

In one aspect of the present invention, the first fluid (FS) includes at least one of perfluorooctane sulfonate (PFOA) and perfluorooctanoate (PFOS).

In one aspect of the present invention, the perfluorooctane sulfonate (PFOA) and/or the perfluorooctanoate (PFOS) is filtered by the first membrane (200).

BRIEF DESCRIPTION OF THE DRAWINGS

These and/or other exemplary aspects and advantages will become apparent and more readily appreciated from the following description and the accompanying drawings.

DETAILED DESCRIPTION OF THE PREFERRED EMBODIMENTS

Without wishing to be bound by theories, the inventors, through their own researches, trials and experiments, have devised that existing water treatment processes have critical shortcomings, such as high energy input, regeneration of the draw solution and limited finishing of the end product.

In one aspect of the present invention, there is provided a novel or otherwise improved wastewater treatment process through a pressure assisted-volume retarded osmosis (PA-VRO) process which combines two cutting edge technologies: forward osmosis (FO) and low-pressure membrane (LPM) process together making a one-cell system. The PA-VRO is an attractive process in terms of energy consumption. In this arrangement, the PA-VRO can use small pressure while removing small or micro pollutants that cannot be removed by the membranes alone using relatively lower pressure. This process is capable of reclaiming potable or non-potable water from wastewater with relatively small amount of energy and thus can be readily applied in water treatment or production industry.

Figure 1:
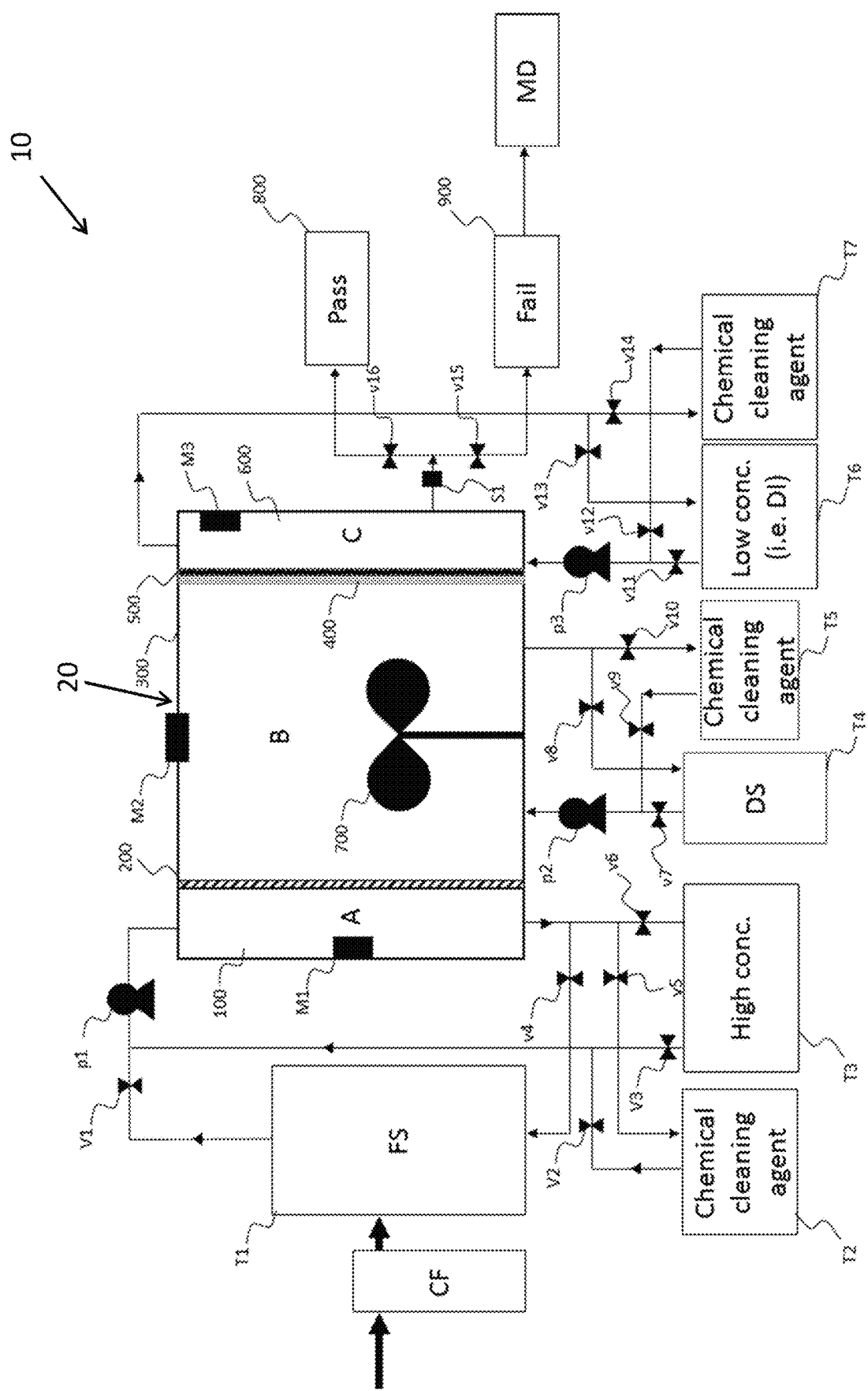
FIG. 1 is a schematic view showing the overall flow of the fluid treatment apparatus in accordance with a first exemplary embodiment of the present invention.
Figure 2:
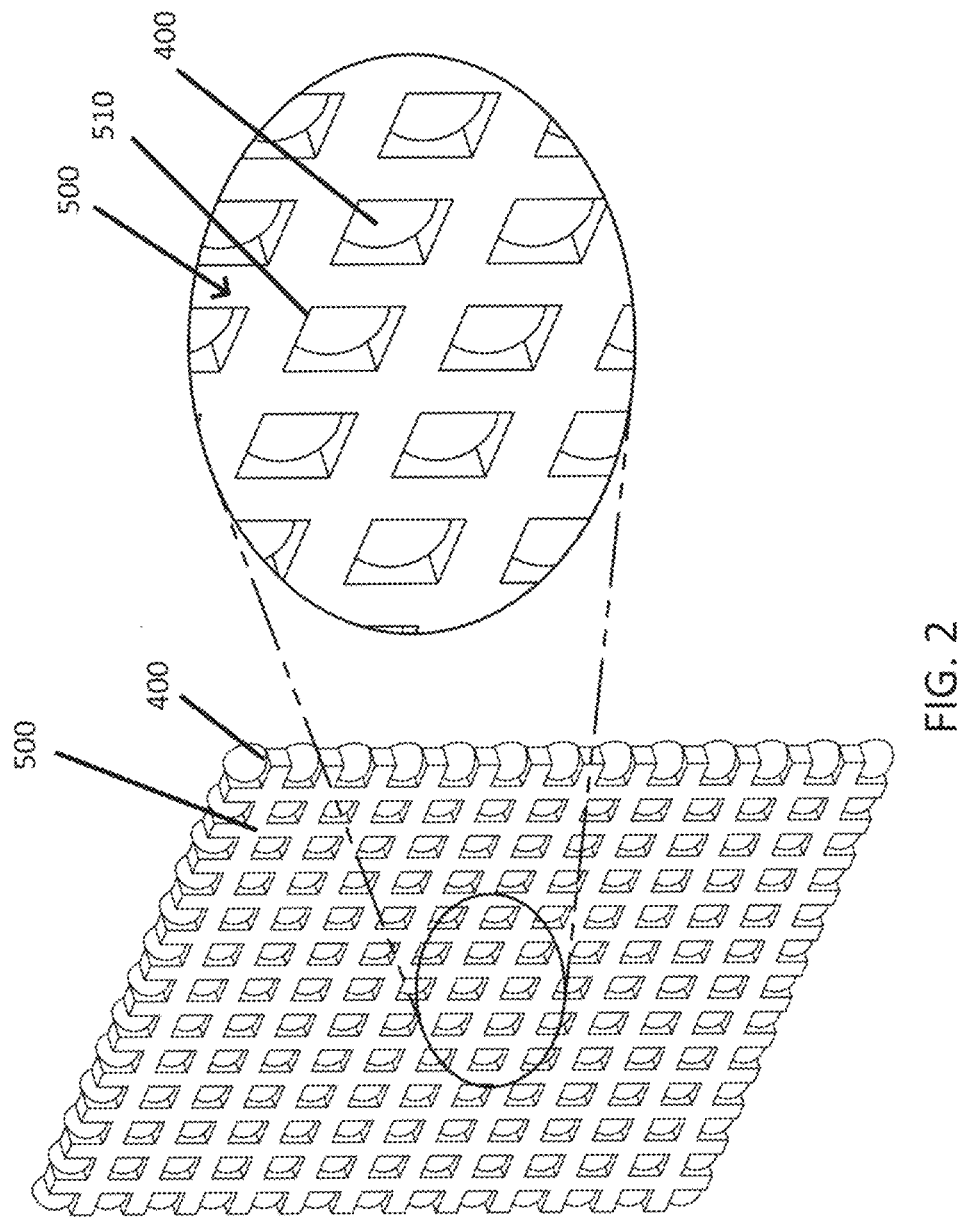
FIG. 2 is a perspective view showing the filtration membrane of the fluid treatment apparatus, reinforced by a rigid spacer.
Figure 3:
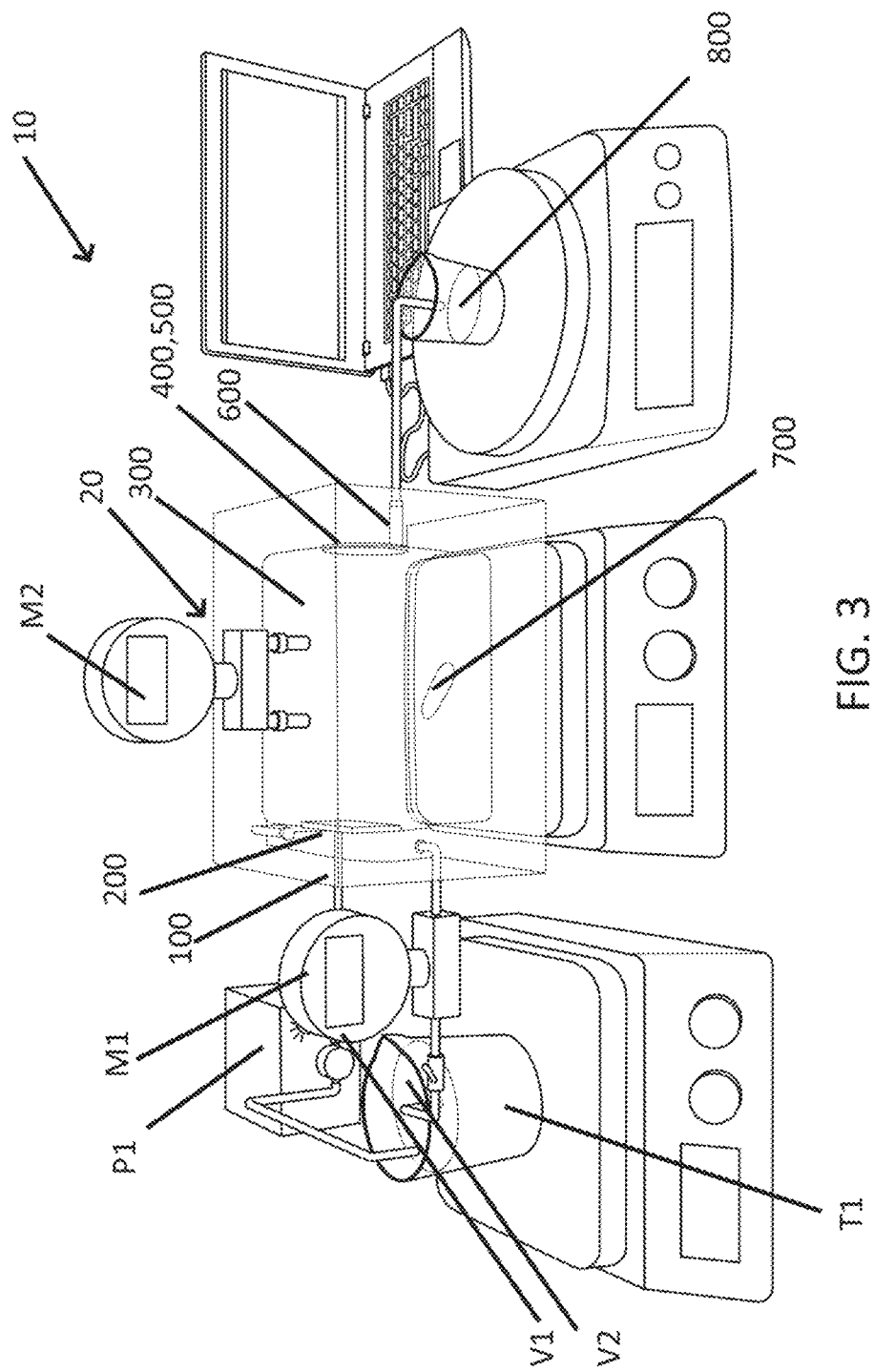
FIG. 3 shows a prototype of one exemplary embodiment of the present invention.

Referring to FIGS. 1 to 3, there is provided a fluid treatment apparatus 10 comprising: a first tank portion 100 arranged to receive a first fluid FS from a first fluid source; a second tank portion 300 adapted to contain a second fluid DS and arranged to receive water molecules of the first fluid FS from the first tank portion 100, wherein the concentration of the second fluid DS is higher than that of the first fluid FS; a third tank portion 600 arranged to collect the water molecules of the first fluid FS from the second tank portion 300; a first membrane 200 positioned between the first and second tank portions 100, 300 and arranged to filter the water molecules of the first fluid FS from the first tank portion 100; and a second membrane 400 positioned between the second and third tank portions 300, 600 and arranged to obtain the water molecules of the first fluid FS from the second tank portion 300, wherein the second membrane 400 has a greater permeability than that of the first membrane 200.

Essentially, the fluid treatment apparatus 10 includes a pressure assisted-volume retarded osmosis (PA-VRO) cell 20 which is constructed by a first tank portion 100, a second tank portion 300, and a third tank portion 600 in fluid communication. These tank portions 100, 300, 600 may be either formed as three separate tanks or integrally formed within the same tank and partitioned to form three compartments.

In this arrangement, there are two fluid inputs; the first fluid as a feed solution (FS) introduced from a first fluid source and the second fluid as a draw solution introduced from a second fluid source. The feed solution is the water to be treated whilst the draw solution serves as the driving fluid.

The feed solution is preferably a wastewater contaminated by PFOA/PFOS without any pre-treatment. For instance, the wastewater may be real wastewater generated by the sewage treatment works.

The draw solution, on the other hand, is preferably a solution of molecules with large molecular size. In the treatment process, flux is driven by osmosis while RSF is driven by diffusion. Thus, the advantage of molecules with large molecular size is that, diffusion may not occur as readily as osmosis through a membrane. This may reduce the RSF caused by diffusion. Preferably, the draw solution is polymer and more preferably, the draw solution is Poly (sodium-4-styrenesulfonate) (PSS) as it has relatively high solubility in water. However, other types of polymer with large molecular size are also suitable for the draw solution.

The inventors have devised that there is a trade-off exists between forward osmosis (FO) and UF processes i.e. increasing concentration results in a better performance in the forward osmosis (FO) process, but is detrimental to filtration performance. Accordingly, a concentration that is not biased towards one process should be used for optimal results. For draw solution DS with higher concentrations, the osmotic pressure required to draw the water into the cell 20 would be high and the minimum pressure required for water permeation in the filtration of the process would also be high.

In contrast, the osmotic pressure required to draw the water into the cell 20 and the minimum pressure required for water permeation in the filtration of the process would be low for a lower concentration draw solution DS. Thus, the concentration of the draw solution DS is relatively low. For instance, draw solution DS formed by poly(sodium-4-styrenesulfonate) is preferably ranged from 10 to 50 g/L.

The inventors have also devised that cell 20 has excessive UF membrane area, which means concentration that is relatively more favourable to FO part of the process could be employed without affecting the end results. Thus, the more preferable concentration of the draw solution DS is 30 g/L.

The three compartments 100, 300 and 600 of the pressure assisted-volume retarded osmosis (PA-VRO) cell 20 are each for feed solution (FS), draw solution (DS) and permeate respectively. The cell 20 is in a closed arrangement and PA-VRO is a process that uses naturally occurring pressure inside the closed cell 20 as the driving force for the draw solution DS regeneration. This allows the direct use of the draw solution DS and hybrid processes for draw solution DS regeneration.

The first tank portion 100 is a container for receiving the wastewater. On the upstream of the first tank portion 100, there is provided a cartridge filter (CF) through which the feed solution FS is pumped through for a pre-screening of larger molecules. There is a further feed solution tank T1 for receiving the pre-screened solution.

The second tank portion 300 is located on one side of the first tank portion 100 and in fluid communication with the first tank portion 100 through the forward osmosis membrane 200. The second tank portion 300 is filled by draw solution and serves as a DS chamber of the cell 20. The second tank portion 300 is also in fluid communication with an external draw solution tank T4, which allows the draw solution in the second tank portion 300 to be temporarily withdrawn if necessary.

As the draw solution DS in the second tank portion 300 is not flowing, concentration polarization (CP) can significantly affect its performance. The inventors have also devised that by increasing the concentration of the draw solution DS, the osmotic pressure is also increased and so does the flux. However, the flux is not directly proportional to the concentration i.e. they are in a non-linear relationship.

In addition, as the draw solution DS described above use polymers and polymers tend to have high viscosities, owing to their large molecular sizes, which increase exponentially with concentration for all polymers. High viscosity therefore leads to significant concentration polarization (CP) which may otherwise hinder the performance of the process.

Furthermore, the boundary layer near the surface of the forward membrane 200 also influences the performance of the process. A boundary layer is a layer near the membrane surface where flow velocity is relatively slower than bulk solution. This slower flow velocity adjacent the membrane surface intensifies concentration polarization (CP), thereby inducing a further decline in the flux.

Thus, there is preferably a stirring means 700 e.g. a stirrer positioned within the second tank portion 300 for mixing the feed solution FS and the draw solution DS to reduce the negative impact of the concentration polarization (CP).

The flow of the feed solution FS from the first tank portion 100 to the second tank portion 300 is not actuated by a pump. Rather, the flow is manipulated by the difference in osmotic pressure between the feed solution FS in the first tank portion 100 and the draw solution DS in the second tank portion 300.

The third tank portion 600 is located on the other side of the second tank portion 300 opposite to the first tank portion 100 and in fluid communication with the second tank portion 300 through the filtration membrane 400. When the water molecules in the feed solution FS is penetrated through the filtration membrane 400, permeate is collected by the third tank portion 600 and treated as clean water.

There are also one or more pressure meters for measuring the pressure at various locations. For instance, M1 to M3 may be provided to measure the pressure within the first, second and third tank portions 100, 300 and 600 respectively.

There are multiple layers of membranes for filtering the solutions; the first membrane 200 and the second membrane 400, each positioned on the two sides of the second tank portion 300. The second membrane 400 has a greater permeability i.e. greater effective membrane area than that of the first membrane 200. In one exemplary example, the first membrane 200 may have an effective membrane area of 10 cm$^2$ and the second membrane 400 may have an effective membrane area of 12.56 cm$^2$ respectively. The first membrane 200 is a forward osmosis membrane and the second membrane 400 is a low-pressure membrane e.g. an ultrafiltration membrane.

The forward osmosis membrane 200 is a semi-permeable membrane. Forward osmosis (FO) is a process that uses the concentration difference between the two solutions; the feed solution (FS) and the draw solution (DS) separated by the semi-permeable membrane 200. Forward osmosis (FO) is driven by the osmotic gradient, meaning that it does not need additional energy input to generate hydraulic pressure, while being able to reject fine substances for having pore sizes similar to those of nano-filtration (NF) and reverse osmosis (RO).

The concentration difference between the two solutions DS, FS produces an osmotic pressure gradient towards the draw solution DS, which has a higher concentration. The osmotic pressure gradient is a naturally developed pressure and is the main driving force in forward osmosis (FO), which makes forward osmosis (FO) more advantageous since no hydraulic pressure or heat is required. This allows volume retarded osmosis (VRO) process to consume less energy compared to the conventional processes and other forward osmosis (FO) hybrid processes. Therefore, using the VRO process can reduce energy consumption while rejecting pollutants that are not removable by low-pressure membranes 400 due to the difference in pore sizes.

The end product after the forward osmosis (FO) is a diluted draw solution DS and the diluted draw solution DS is then subjected to further processing to separate water from DS i.e. to collect more concentrated draw solution DS.

The filtration membrane 400 is a low pressure membrane. In particular, pressure drives the feed solution FS from the draw solution DS through the low pressure membrane 400 while pollutants bigger than the pore size are retained. The low pressure membrane 400 is used as a secondary treatment of the forward osmosis (FO).

The pore sizes of these filtration membranes 400 are relatively large to pass through fine colloids, Ions, organic molecules with small molecular weight, etc. For instance, the low pressure membrane (LPM) 400 may be microfiltration (MF) and ultrafiltration (UF) which use relatively low pressure of 0.3-0.5 bar and 1-3 bar respectively.

Preferably, membrane 400 with a relative larger ultrafiltration membrane area is used to allow for a larger volume of water, thereby minimizing the pressure. Consequently, water molecules moving from the feed solution FS to the draw solution DS could be readily removed from the draw solution DS as permeate, as larger membrane area results in greater permeate volume.

In one example embodiment of the present invention, the filtration membrane 400 as depicted in FIG. 2 is supported by a disk-type porous spacer 500 with uniform holes 510. The spacer 500 is made of a relatively more rigid material than the filtration membrane 400. To reinforce the membrane 400, the spacer 500 is placed next to the membrane 400. The body of the spacer 500 prevents the excessive movement of the membrane 400.

Preferably, the fluid treatment apparatus 10 may also include tanks T1 to T7 for containing different kind of chemical serving different purposes. For instance, T1 may be a feed solution tank for temporary storage of the feed solution prior to feeding into the first tank portion 100 and similarly, T4 may be a draw solution tank for temporary storage of the draw solution prior to the cleaning of the fluid treatment apparatus. T2, T5, T7 may be tanks for storage of chemical cleaning agent. T3 may be a tank for storage of high concentration solution whilst T7 may be a tank for storage of low concentration solution.

Multiple valves may be used to regulate on and off of particular components in the flow path of the fluid treatment apparatus 10 in different circumstances. Valve V1 is provided between the feed solution tank T1 and the first tank portion 100. Valves V2 and V5 are provided at the outlet and the inlet of the chemical cleaning agent tank T2. Valves V3 and V6 are provided at the outlet and inlet of the high concentration fluid tank T3. Valves V7 and V8 are provided at the outlet and the inlet of the DS tank T4. Valves V9 and V10 are provided at the outlet and inlet of the chemical cleaning agent tank T5. Valves V11 and V13 are provided at the outlet and inlet of the low concentration fluid tank T6. Valves V12 and V14 are provided at the outlet and inlet of the chemical cleaning agent tank T7.

There are also one or more pumping modules for regulating the relative pressure within the different container portions of the fluid treatment apparatus 10.

Preferably, pump P1 is a circulation pump for the feed circulation in the forward osmosis (FO) part of the process. P1 is also in fluid communication with the feed solution tank T1, chemical cleaning agent tank T2, and high concentration fluid tank T3 such that, by manipulation of the on and off of the valves V1 to V6, different solutions may be pumped into the first tank portion 100 by P1.

The inventors have also devised that the flux is biased towards the forward osmosis (FO) process. The pressure inside the cell acts against the osmotic pressure, which significantly decreases the net physical pressure in the forward osmosis (FO) part of the process. Thus, the pressure inside the cell is a crucial factor that hinders overall flux and reverse solute flux (RSF).

In one preferred embodiment, a small inlet pressure equal to the pressure inside the cell 20 is applied to the feed solution FS channel e.g. a minimal hydraulic pressure is used on the feed side by P1 to match and counteract the osmotic pressure generated inside the second tank portion 300 of the cell 20 and make the net physical pressure to be zero. This allows osmotic pressure to function as the sole driving pressure for the forward osmosis (FO) part of the process and the concentration inside the cell 20 is sustained, thereby effectively counteracts the biasing flux i.e. minimizing the reverse solute flux (RSF) and maximizing the permeate flux.

Pump P2 may be in fluid communication with the draw solution tank T4 and the chemical cleaning agent tank T5 such that, by manipulation of the on and off of the valves V7 to V10, different solutions may be pumped by P2 into the second tank portion 300. For instance, pump P2 may be operated to pump the draw solution stored in the external draw solution tank T4 back to the second tank portion 300.

Similarly, pump P3 may be in fluid communication with the low concentration fluid tank T6 and the chemical cleaning agent tank T7 such that, by manipulation of the on and off of the valves V11 to V14, different solutions may be pumped by P3 into the third tank portion 600.

There is also provided a high-quality water tank 800 and a low-quality water tank 900 for receiving the permeate from the third tank portion 600. Valve 15 is provided between the third tank portion 600 and the high-quality water tank 800. Valve 16 is provided between the third tank portion 600 and the low-quality water tank 900. Although the third tank portion 600 is in fluid communication with both tanks 800 and 900, water is only discharged to one of the two tanks 800 and 900, depending on the quality of the water treatment. Optionally, the low-quality water tank 900 may discharge the collected permeate for further processing e.g. membrane distillation (MD) to enhance the quality of the permeate.

In one preferred embodiment, the fluid treatment apparatus 10 may also include a sensing module S1 to determine the quality of the permeate collected by the third container portion 600 based on one or more threshold. For instance, the sensing module S1 may determine the polyelectrolyte concentration of the permeate and in turn divert the permeate into one of the high-quality water tank 800 and the low-quality water tank 900.

The detailed process of the present invention will now be described with reference to FIG. 1. The waste water or targeted feed solution FS goes through the cartridge filter (CF) for removal of colloids and proceeds to the FS tank T1. From FS tank T1, the feed solution FS is circulated through the first tank portion 100 using the gear pump P1. For this circulation, valves V1 and V4 are open.

In order to minimize concentration polarization, water molecules permeated from the feed solution FS through the forward osmosis membrane 200 and the draw solution DS are mixed together steady within the second tank portion 300 by the stirrer 700. Upon receiving a certain amount of water molecules of the feed solution FS from the first tank portion 100, the increased volume may generate an internal pressure. Once enough pressure is generated inside the second tank portion 300, water will permeate towards the third tank portion 600 through the filtration membrane 400 and the spacer 500.

Preferably, the pressure in the first tank portion 100 is measured with the pressure meter M1 and the pressure generated inside the second tank portion 300 is measured with the pressure meter M2. Subsequently, the flow path through valve V4 is adjusted to generate pressure in the first tank portion 100 to match the pressure in the second tank portion 300. This allows the osmotic pressure to be the only pressure acting on the forward osmosis membrane 200 placed between the first tank portion 100 and the second tank portion 300.

Due to the difference in osmotic pressure between the feed solution FS in the first tank portion 100 and the draw solution DS in the second tank portion 300, water moves from the first tank portion 100 towards the second tank portion 300 through the forward osmosis (FO) membrane 200. This generates the pressure inside the second tank portion 300, which is used as the working pressure for the low-pressure membrane (LPM) 400 placed between the second tank portion 300 and the third tank portion 600.

For the transport of the permeate from the third tank portion 600, valve V15 and V16 are operable to open and close depending on the permeate quality, which will be determined by the sensor S1.

If the permeate quality meets the set standard, valve V15 closes and value V16 opens, leading the permeate to flow into the high-quality water tank 800.

Conversely, if the permeate quality does not meet the standard, valve V15 opens and valve V16 closes, which leads the permeate to flow into the tank 900 where permeate with relatively higher polyelectrolyte concentration is stored. The collected permeate in S900 is then subjected to membrane distillation (MD) to be further concentrated. The concentrated permeate may be used in other applications later. Through this membrane distillation (MD) process, additional amount of high quality permeate is obtained.

The present invention also teaches one or more cleaning process which allows the closed cell 20 to be cleaned for maintenance. The cleaning process may be incorporated for instance as a chemical cleaning mechanism and a physical cleaning mechanism.

In one example embodiment of the chemical cleaning mechanism, chemical cleaning agent tanks T2, T5, T7 are each in fluid communication with the first tank portion 100, the second tank portion 300, and the third tank portion 600 respectively. These chemical cleaning agent tanks T2, T5, T7 may introduce chemical cleaning agent into each of the first tank portion 100, the second tank portion 300, and the third tank portion 600 individually for chemical cleaning purpose.

Prior to chemical cleaning, draw solution DS in the second tank portion 300 is emptied out by closing all the valves but valve V8, which allows the draw solution DS to flow into the external draw solution tank T4.

After draining the draw solution DS into the external draw solution tank T4, V8 closes and the three pairs of valves V2, V5, V9, V10, and V12, V15 open to initiate the chemical cleaning in the first tank portion 100, the second tank portion 300, and the third tank portion 600. During the cleaning, the cleaning agents in the chemical cleaning agent tanks T2, T5, T7 are circulated and the first tank portion 100, the second tank portion 300, and the third tank portion 600 are cleaned through three separate closed circulation flow. Once the cleaning is done, valve V7 reopens and draw solution DS will flow back into the second tank portion 300 by pump P2.

In one example embodiment of the physical cleaning mechanism, there is provided a high concentration solution tank T3 in fluid communication with the first tank portion 100 and a low concentration solution tank T6 in fluid communication with the third tank portion 600.

For physical cleaning, a high concentration fluid may be introduced into and circulated through the first tank portion 100 and a low concentration fluid e.g. deionized water (DI) or clean water may be introduced into the third tank portion 600. The introduction of these fluids generates a concentration gradient and thus guides the fluid to flow in a desirable manner.

For instance, physical cleaning can be done through osmotic backwashing. During this process, valves V1, V4 are closed to disconnect the fluid communication between the cell 20 and the feed solution tank T1, and valves V15, V16 are closed to disconnect the fluid communication between the cell 20 and tanks 800, 900.

Next, valves V11, V13 open to allow solution with lower concentration from the low concentration tank T6 or clean water to circulate through the third tank portion 600 by pump P3. V13 is used to control the pressure inside the third tank portion 600 to initiate the water flow towards the second tank portion 300, because the osmotic pressure difference between the second tank portion 300 and the third tank portion 600 may be smaller than the pressure inside the second tank portion 300. This allows water to move from the third tank portion 600 to the second tank portion 300, and in turn cleans the surface of both the LPM 400 and the spacer 500 while generating pressure inside the second tank portion 300.

Meanwhile, V3 and V6 also open to circulate solution with a concentration higher than the draw solution from high concentration fluid tank T3 through the first tank portion 100 using pump P1. Thus, a concentration difference and the osmotic pressure difference between the first tank portion 100 and the second tank portion 300 is presence and the concentration gradient is biased towards the first tank portion 100. The pressure inside the second tank portion 300, as well as the concentration difference, allows water to move from the second tank portion 300 to the first tank portion 100, thereby cleaning both surfaces of the forward osmosis membrane 200.

Referring now to FIG. 3 for the detailed description of the graphical representation of the PA-VRO set-up. The apparatus 10 is consisted of an feed solution FS tank T1 that contains secondary wastewater, a permeate tank 800, circulation pump P1, a magnetic stirrer 700, a customized PA-VRO cell 20 with three compartments 100, 300, 600, a forward oasis membrane 200 and a UF membrane 400 placed on the opposite side of the cell 20, a porous disk-like spacer 500 placed against the support layer of the membrane 400 to prevent damage to the cell 200 from the pressure, two pressure meters M1 and M2, and valves V1 and V2.

Valve V1 is used to control the inlet pressure, and pressure meters M1 and M2 are used to measure the pressure of the cell 20 as well as the inlet pressure of the feed solution FS. The inlet pressure of the feed solution FS is operated to match the pressure inside the cell 20, which allows the net physical pressure to be zero. This not only minimizes the reverse solute flux (RSF), but also sustains the solute concentration and thus allows the second tank portion of the cell 20 i.e. the draw solution DS tank to have a higher working pressure for driving the filtration at the UF membrane 400.

Following the 6-day pre-treatment of PA-VRO operation for removal of small PSS molecules, real wastewater is used as the feed solution FS for 2-day operation i.e. 48 hours for removal of PFOA/PFOS through PA-VRO system 10. The rejection rate for PSS and PFOA/PFOS are both maintained well over 90%, with the rejection of PSS by the UF membrane 400 being greater than 99% throughout the treatment. There are no traceable amount of PFOA/PFOS in the draw solution DS in the second tank portion of the cell 20. The flux remains constant over the period and the rejection rate of PFOA/PFOS by the FO membrane 200 is almost 100%.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

The foregoing describes some example embodiment (or embodiments) of the present invention and modifications, obvious to those skilled in the art, can be made thereto without departing from the scope of the present invention. While the invention has been described with reference to the example embodiments it should be appreciated that the invention can be embodied in many other forms.

Reference to any prior art in this specification is not, and should not be taken as, an acknowledgement or any form of suggestion that the prior art forms part of the common general knowledge in the field of endeavour in any country in the world.

Although the present disclosure has been described in terms of certain embodiments, other embodiments apparent to those of ordinary skill in the art also are within the scope of this disclosure. Thus, various changes and modifications may be made without departing from the spirit and scope of the disclosure. For instance, various components may be repositioned as desired. Features from any of the described embodiments may be combined with each other and/or an apparatus may comprise one, more, or all of the features of the above described embodiments. Moreover, not all of the features, aspects and advantages are necessarily required to practice the present disclosure. Accordingly, the scope of the present disclosure is intended to be defined only by the claims that follow.

The various configurations or embodiments described are exemplary configurations only. Any one or more features from any of the configurations may be used in combination with any one or more features from any of the other configurations.

The invention claimed is:

1. A fluid treatment apparatus comprising:
   a first tank portion arranged to receive a first fluid from a first fluid source;

a second tank portion adapted to contain a second fluid and arranged to receive water molecules of the first fluid from the first tank portion by forward osmosis, wherein a concentration of the second fluid is higher than that of the first fluid;

a third tank portion arranged to collect the water molecules of the first fluid from the second tank portion;

a first membrane positioned between the first and second tank portions and arranged to filter the water molecules of the first fluid from the first tank portion;

a second membrane positioned between the second and third tank portions and arranged to obtain the water molecules of the first fluid from the second tank portion, wherein the second membrane has a greater permeability than that of the first membrane;

a sensing module arranged to determine the quality of a collected fluid by the third tank portion, wherein the collected fluid is transferred into a first tank if the quality of the fluid satisfies a first threshold, and the collected fluid is transferred into a second tank and subjected to membrane distillation if the quality of the fluid is below the first threshold; and a first pressure meter arranged to measure a pressure in the first tank portion, a second pressure meter arranged to measure a pressure in the second tank portion, and at least one adjustable valve in fluid communication with the first tank portion to generate pressure in the first tank portion to match the pressure in the second tank portion.

2. A fluid treatment apparatus in accordance with claim 1, wherein the flow of the first fluid from the first tank portion to the second tank portion is manipulated by an osmotic pressure difference between the first fluid in the first tank portion and the second fluid in the second tank portion.

3. A fluid treatment apparatus in accordance with claim 2, further including a pump unit to apply a pressure to maintain the osmotic pressure difference between the first fluid in the first tank portion and the second fluid in the second tank portion.

4. A fluid treatment apparatus in accordance with claim 1, further including a pump unit to make a net physical pressure of the first tank portion and the second tank portion zero.

5. A fluid treatment apparatus in accordance with claim 4, wherein the pump unit pressurizes the first tank portion, thereby counteracting against the osmotic pressure generated in the second tank portion.

6. A fluid treatment apparatus in accordance with claim 1, wherein the second membrane has a greater effective membrane area than the first membrane.

7. A fluid treatment apparatus in accordance with claim 1, wherein the second membrane is a low pressure membrane.

8. A fluid treatment apparatus in accordance with claim 1, wherein the second membrane is reinforced by a porous spacer.

9. A fluid treatment apparatus in accordance with claim 1, wherein the flow of the first fluid from the second tank portion to the third tank portion is manipulated by the internal pressure resulted from an increase of volume of the first fluid in the second tank portion.

10. A fluid treatment apparatus in accordance with claim 9, further including a stirrer arranged to facilitate a uniform concentration of the first fluid and the second fluid in the second tank portion.

11. A fluid treatment apparatus in accordance with claim 1, further including a low concentration source in fluid communication with the third tank portion, whereby a low concentration fluid is flowed from the third tank portion to the second tank portion by the osmotic pressure difference between the second tank portion and the third tank portion.

12. A fluid treatment apparatus in accordance with claim 11, further including a high concentration source in fluid communication with the first tank portion, whereby a high concentration fluid is circulated through the first tank portion to generate the osmotic pressure difference between the first tank portion and the second tank portion.

13. A fluid treatment apparatus in accordance with claim 12, further including a retaining tank operable to temporarily retain the second fluid of the second tank portion.

14. A fluid treatment apparatus in accordance with claim 1, further including at least one cleaning agent source in fluid communication with one of the tank portions.

15. A fluid treatment apparatus in accordance with claim 14, wherein the at least one cleaning agent source includes a chemical cleaning agent.

16. A fluid treatment apparatus in accordance with claim 1, wherein the first threshold is associated with a polyelectrolyte concentration.

17. A fluid treatment apparatus in accordance with claim 1, wherein the second fluid has a concentration ranged from 10 to 50 g/L.

18. A fluid treatment apparatus in accordance with claim 17, wherein the second fluid includes polymer.

19. A fluid treatment apparatus in accordance with claim 18, wherein the polymer includes Poly(sodium 4-styrenesulfonate).

20. A fluid treatment apparatus in accordance with claim 19, wherein the Poly(sodium 4-styrenesulfonate) is filtered by the second membrane.

21. A fluid treatment apparatus in accordance with claim 1, wherein the first fluid includes at least one of perfluorooctane sulfonate (PFOA) and perfluorooctanoate (PFOS).

22. A fluid treatment apparatus in accordance with claim 21, wherein the perfluorooctane sulfonate (PFOA) and/or the perfluorooctanoate (PFOS) is filtered by the first membrane.

* * * * *